United States Patent [19]

Ishikawa

[11] 4,031,770

[45] June 28, 1977

[54] DUAL TOOTH CONTACT TYPE W-N GEAR

[75] Inventor: Shoichi Ishikawa, Yokohama, Japan

[73] Assignee: Kabushiki Kaisha Hasegawa Haguruma, Tokyo, Japan

[22] Filed: Apr. 5, 1976

[21] Appl. No.: 673,896

[30] Foreign Application Priority Data

Apr. 7, 1975 Japan .............................. 50-41200

[52] U.S. Cl. .............................. 74/462; 74/DIG. 12
[51] Int. Cl.² ........................................ F16H 55/06
[58] Field of Search ...... 74/462, 460, 457, DIG. 12

[56] References Cited

UNITED STATES PATENTS 3,180,172  4/1965  Leggatt ................................ 74/462
3,855,874  12/1974  Honma et al. ....................... 74/462

Primary Examiner—Leonard H. Gerin
Attorney, Agent, or Firm—Oldham & Oldham Co.

[57] ABSTRACT

W-N gears of novel basic rack tooth profile designed to have at all times two points of meshing contact located in the same reference plane, one on an addendum arc of first tooth and the other on the dedendum arc of a second tooth neighboring the first tooth on its side opposite to the addendum arc, so that at the respective points of contacts the addendum and dedendum arcs have lines of radius aligned with each other. Such dual tooth contact enables much smoother and quieter gear operation, the points of contact proceeding in the direction of tooth trace.

2 Claims, 7 Drawing Figures

| | Meshing Contact on Addendum of Tooth 1 | | | |
|---|---|---|---|---|
| | Contact on Dedendum of Tooth 2 | Contact on Addendum of Tooth 2 | | |
| | | Contact on Deddendum of Tooth 3 | | Contact on Addendum of Tooth 3 |
| | | | | Contact on Deddendum of Tooth 4 |
| Progress of Meshing → | | | | |
| The Number of Meshing Teeth | 2 | 2 | 2 | 2 |
| The Number of Contact Points | 2 | 2 | 2 | 2 |

DUAL TOOTH CONTACT TYPE W-N GEAR

BACKGROUND OF THE INVENTION

This invention relates to improvements in W-N gears or gears of the kind whose basic rack tooth profile on normal or transverse reference plane or the tooth surface is composed of addendum-defining convex circular acrs and dedendum-defining concave circular arcs and is intended to provide novel double tooth contact or double mesh type gears of the kind described which are highly advantageous from the viewpoints of manufacture and performance.

As is well known in the art, a pair of mating W-N gears of the kind described operate with their circular arc tooth surfaces successively making meshing contact and, having a transverse contact ratio of zero or approximately zero, rely for transmission of rotation exclusively upon the tooth trace. In this sense, W-N gears in essence can be considered helical gears.

With conventional forms of W-N gear, meshing contact of the addendum and that of the dedendum take place at the same time and separately in different reference planes, their location shifting progressively in the direction of tooth trace with rotation of the mating gears. Accordingly, with W-N gears, transmission of rotation can be effected smoothly so long as a requisite value of axial overlap contact ratio is obtained.

Generally, with involute spur gears, it is well known that, as the transverse contact ratio is raised to exceed 2, not only torque variations but also vibration and noise in operation are substantially reduced owing to the fact that they have at all times two teeth held in meshing contact and hence their teeth are subjected only to bending load of limited fluctuation.

With conventional W-N gears, however, it is not at all times advisable to raise the number of the contact tooth to 2 or above with a view to obtaining similar operational effects as it makes it necessary to accordingly increase the axial overlap contact ratio and this in turn necessitates a greater length of tooth trace as long as the helix angle is held within certain limits to maintain the tooth surface strength at a level desired, involving some problems to be considered in regard to machining and assembling accuracies, tooth deflection, etc..

One relatively recent prior art patent upon W-N gears is U.S. Pat. No. 3,855,874, issued Dec. 24, 1974. Such patent particularly relates to these W-N gears that include gear teeth having profiles each including circular addendum and dedendum arcs connected by a straight line segment at the pitch line area.

SUMMARY OF THE INVENTION

Under these circumstances, the present invention has for its object the provision of a pair of dual tooth contact and double mesh type W-N gears having a basic rack tooth profils designed to give tooth contact at all times at two locations in one and the same transverse or normal reference plane, one of the addendum, convex circular arc on one side of a tooth profile and the other on the dedendum, concave circular are on the same side of a neighboring tooth lying on the side opposite the former profile, the addendum and dedendum arcs having at the respective points of meshing contact radius lines aligned or lying on a common straight line. With W-N gears having such basic rack tooth profile, since the lines normal to the surfaces of two neighboring teeth and extending through the respective points of meshing contact thereon extend at the same time through the pitch point of the meshing gears, the two teeth make meshing contact at the same time in the same reference plane. This not only reduces variations in stiffness of teeth under bending load but also effectively prevents any improper tooth bearing as resulting from machining and assembling errors or deflection of teeth when loaded, and reduces vibration and noise in operation. The basic rack tooth profile of W-N gears of the present invention has an additional advantage that it facilitates determination of accuracy of teeth formed and thus helps improve the machining accuracy.

The above and other objects, features and advantages of the present invention will become apparent from the following description when taken in conjunction with the accompanying drawings.

DESCRIPTION OF THE PREFERRED EMBODIMENTS

Figure 1:
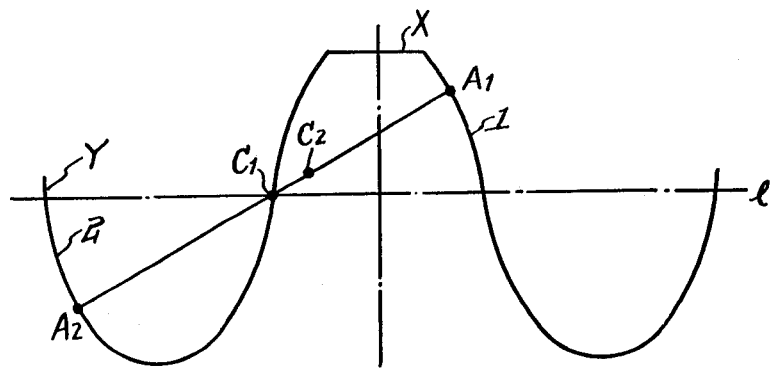
FIG. 1 illustrates the basic rack tooth profile of one preferred embodiment of the present invention, taken in a transverse or normal reference plane.

Reference is made first to FIG. 1, which illustrates the basic rack tooth profile, taken in a transverse or normal reference plane, of one embodiment of the present invention.

In FIG. 1, reference numeral 1 indicates a convex circular arc forming an adendum of a rack tooth X on one side thereof, reference character $A_1$ indicating a point of meshing contact set on the addendum arc 1. Reference numeral 2 indicates a concave circular arc forming a dendum of another tooth Y which neighbors the tooth X on its side opposite to the addendum arc 1, $A_2$ indicating a point of meshing contact set on the dedendum arc 2. The center $C_1$ of convex circular arc 1 lies at the point of intersection of the straight line $A_1 - A_2$ and the pitch line 1 of the basic rack and the radius $A_1C_1$ of convex circular arc 1 is equal in length to the segment $A_2C_1$ of the straight line $A_1 - A_2$. As observed, the center $C_2$ of concave circular arc 2 lies on the straight line $A_1 - A_2$, as with the case of center $C_1$ of convex arc 1, and the length of radius $A_2C_2$ of the concave arc 2 is a little greater than that $A_1C_1$ of convex arc 1. It is to be noted that such basic rack formation gives a dual tooth contact type W-N gear which makes point contact on two neighboring teeth simultaneously at respective points $A_1$ and $A_2$ when point $C_1$ coincides with the pitch point in the same reference plane.

Figure 2:
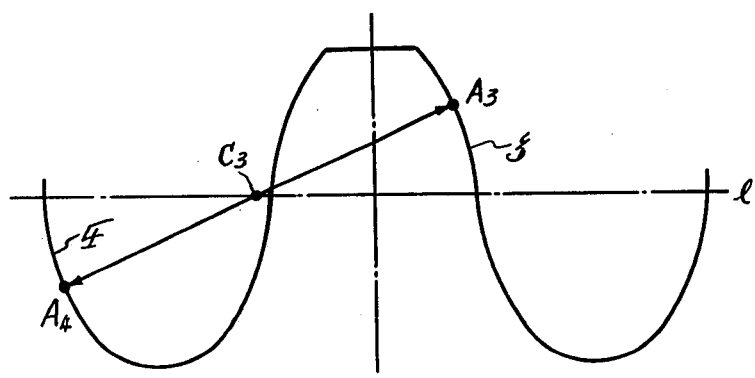
FIG. 2 is an illustration, similar to FIG. 1, of another embodiment of the invention.

FIG. 2 illustrates the basic rack tooth profile of another embodiment of the present invention, taken in a transverse or normal reference plane.

As illustrated, the addendum, convex circular arc 3 of the tooth profile has a radius equal in length to that of dedendum, concave circular arc 4 thereof, the centers of the two arcs coinciding with each other at a point $C_3$ on the pitch line 1. With this basic rack tooth profile, a line of radius $A_3 - C_3$ of convex circular arc 3 and that $A_4 - C_3$ of concave circular arc 4 are aligned with each other to define a straight line passing the point $C_3$ and the points $A_3$ and $A_4$, respectively, lying on the convex and concave circular arcs 3 and 4 represent respective points of meshing contact.

In this manner, such basic rack tooth profile forms a dual tooth contact type W-N gear of which two neighboring teeth make line contact with the mating gear simultaneously along the convex and concave circular arcs 3 and 4, respectively, including points $A_3$ and $A_4$, when the point $C_3$ coincides with the pitch point in the same reference plane.

Figure 3:
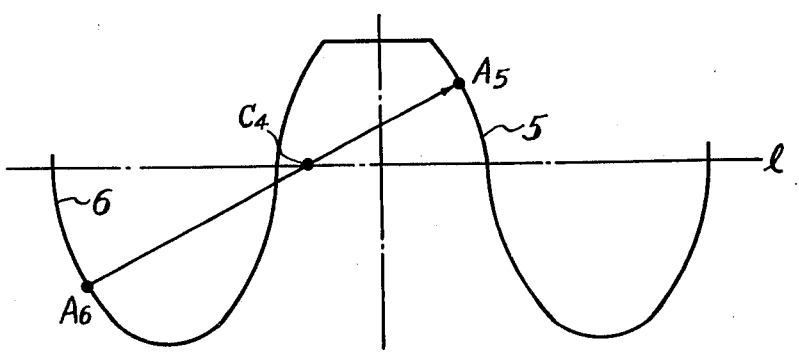
FIG. 3 is an illustration, similar to FIGS. 1 and 2, of a further embodiment of the invention.

FIG. 3 illustrates the basic rack tooth profile of a further embodiment of the present invention, taken in a transverse or normal reference plane. In this figure, point $A_5$ represents a point of tooth contact set on the addendum, convex circular arc 5 and point $A_6$ another point of tooth contact set on the dedendum, concave circular arc 6. The centers of convex and concave circular arcs 5 and 6 coincide with each other at the intersection $C_4$ of the straight line $A_5 - A_6$ and the pitch line 1. As observed, the length of radius $\overline{A_6C_4}$ of the concave arc 6 is somewhat grater than that of radius $\overline{A_5C_4}$ of convex arc 5.

Such form of basic rack tooth profile gives a dual tooth contact type W-N gear of which two neighboring teeth make point contact with a mating gear at two points $A_5$ and $A_6$ in the same reference plane, as will be described in further detail with reference to FIG. 4, which illustrates how a pair of such W-N gears are actually placed in meshing engagement with each other.

Figure 4:
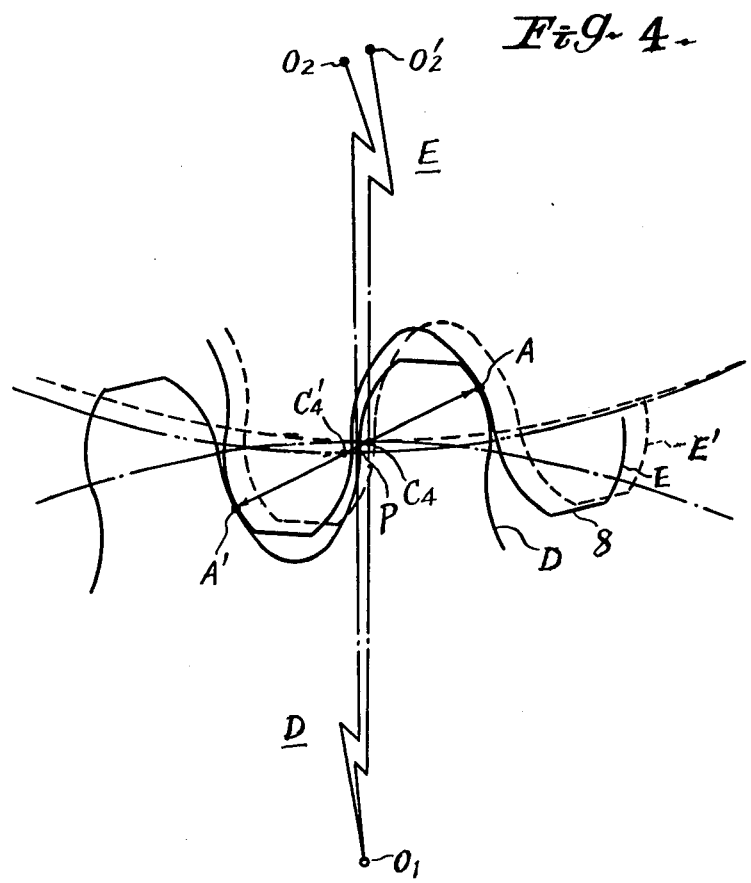
FIG. 4 is a diagram showing the meshing state of a pair of W-N gears formed of the basic rack tooth profile of FIG. 3 in one and the same reference plane.

In FIG. 4, reference characters $O_1$ and $O_2$ designate the centers of the individual gears D and E formed of the basic rack tooth profile of FIG. 3; $C_4$, the common center of the convex and concave circular arcs of gear D including respective points of tooth contact, A and A'; and $C_4'$, the common center of the convex and concave circular arcs of gear E including respective points of tooth contact, A and A'. In actual use, however, the pair of gears D and E must be arranged with the center distance slightly reduced from $\overline{O_1O_2}'$ to $\overline{O_1O_2}$ and the intermeshing pitch circles are circles centered at $O_1$ and $O_2$, respectively, and extending through the intermeshing pitch point, P, though not shown in FIG. 4. Incidentally, the dotted line E' indicates gear E imaginarily positioned retative to gear D as for tooth generation.

Previously known is the technique of forming on a pair of W-N gears accurate convex and concave circular arcs differing in radius from each other to obtain correct point contact between such circular arcs of the mating gears, as illustrated in the embodiment of FIG. 3. It is to be understood, however, that the instant embodiment represents an important advancement over the technique which enables dual tooth contact between a pair of such line contact W-N gears.

Figure 5:
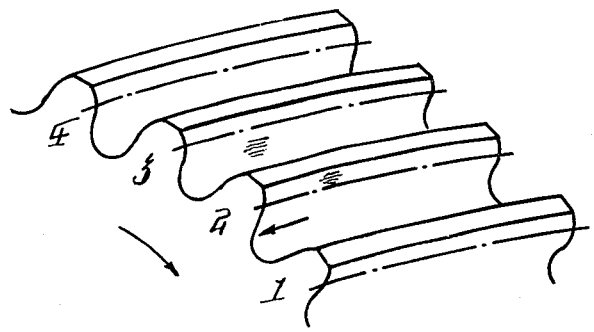
FIG. 5 is a fragmentary oblique view of a W-N gear formed according to the present invention, showing the position of contact points and the direction of their movement to explain the meshing process thereof.
Figures 5A, 6:
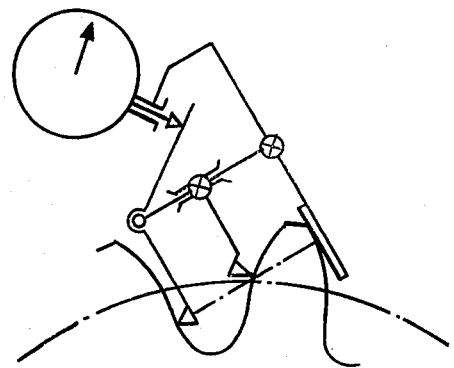
FIG. 5a is a chart diagram showing the number of simultaneously meshing teeth and locations of meshing contact for successive angular positions of the gear shown in FIG. 5, assuming an axial overlap contact ratio slightly above 1.
FIG. 6 illustrates a method of testing W-N gears of the present invention for accuracy of tooth form.

It will be readily appreciated from the foregoing description that, according to the present invention, there are two neighboring teeth simultaneously coming into meshing contact in any reference plane for tooth profile whenever contact takes place in the reference plane and the two points of contact proceed in the direction of tooth trace. It follows, therefore, that there are at all times two teeth participating in meshing contact within the same reference plane irrespective of the angular position of the gear in operation, as illustrated in FIG. 5a, as long as an overlap contact ratio is selected which slightly exceeds 1, and hence variations in rigidity or stiffness of teeth under bending stress can be reduced to a minimum by appropriately relieving the face end to alleviate the load fluctuation occurring with load delivery at the face end. It will be apparent that in this manner substantial reduction in torque variation and hence in vibration and noise can be readily effected and this makes application of W-N gears to various fields of high-speed operation much easier.

Further, according to the present invention, even if some tooth deflection occurs owing to machining and assembling errors and load applied, its influence upon the tooth bearing is small compared with that in the case of conventional forms of W-N gear because of the dual tooth contact effected in the same reference plane and this forms another characteristic feature of W-N gears of the present invention.

Further, use of the tooth profile of the present invention is desirable from the practical viewpoint of quality control of gear teeth in production as it makes it possible to determine a sort of normal pitch by measuring the distance between the addendum arc of a tooth and the dedencum arc of the next following tooth, taking the addendum arc as the reference of measurement, as illustrated in FIG. 6. With the system of FIG. 1, the vicinity of the contact points is to be taken into account.

Though a few embodiments of the present invention and more particularly a few typical forms of basic rack tooth profiles usable for dual tooth contact type W-N gears of the invention have been shown and described, it will be apparent to those skilled in the art that many changes and modifications may be made therein without departing from the spirit of the invention or the scope of the appended claims and any forms of W-N gear are within the contemplation of the present invention which are approximately the same in tooth profile, meshing mode and effects deriving therefrom as the dual tooth contact type W-N gears illustrated herein, in comparison with conventional forms of W-N gear.

What is claimed is:

1. A dual tooth contact type W-N gearing including a pair of helical gears of which the basic rack tooth profile, as taken in a transverse or normal-to-teeth reference plane, is composed of addendum convex circular arcs and dedendum concave circular arcs, characterized in that the basic rack tooth profile is so defined that the addendum convex circular arc on one side of a tooth and the dedendum concave circular arc on the same side of another tooth neighboring said tooth on the other side thereof have both a point of meshing contact set on the circular arc so as to have at the respective points of meshing contact lines of radius lying on one and the same straight line.

2. A dual tooth contact type W-N gearing as claimed in claim 1, in which the centers of said addendum and dedendum circular arcs coincide with each other on the pitch line of the basic rack tooth profile.

* * * * *

UNITED STATES PATENT OFFICE
CERTIFICATE OF CORRECTION

Patent No. 4,031,770        Dated June 28, 1977

Inventor(s) Shoichi Ishikawa

It is certified that error appears in the above-identified patent and that said Letters Patent are hereby corrected as shown below:

Column 1, line 59, "of" should be -- on --

Column 2, line 58, "pitch line 1" should be -- pitch line $\ell$ --

Column 2, line 59, "$A_1C_1$" should be -- $\overline{A_1C_1}$ --

Column 2, line 60, "$A_2C_1$" should be -- $\overline{A_2C_1}$ --

Column 2, line 63, "$A_2C_2$" should be -- $\overline{A_2C_2}$ --

Column 2, line 64, "$A_1C_1$" should be -- $\overline{A_1C_1}$ --

Column 3, line 10, "pitch line 1" should be -- pitch line $\ell$ --

Column 3, line 32, "pitch line 1" should be -- pitch line $\ell$ --

Signed and Sealed this

Twentieth Day of September 1977

[SEAL]

Attest:

RUTH C. MASON
*Attesting Officer*

LUTRELLE F. PARKER
*Acting Commissioner of Patents and Trademarks*